(No Model.)
O. LAMM, Jr.
CENTRIFUGAL CREAMER.
No. 327,090.　　　　　　　　Patented Sept. 29, 1885.
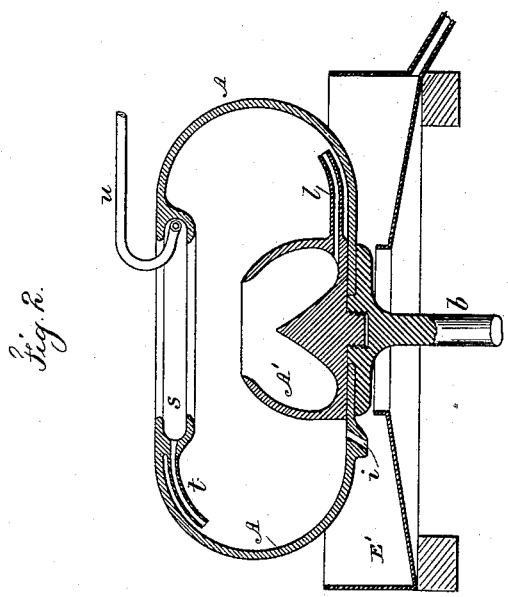
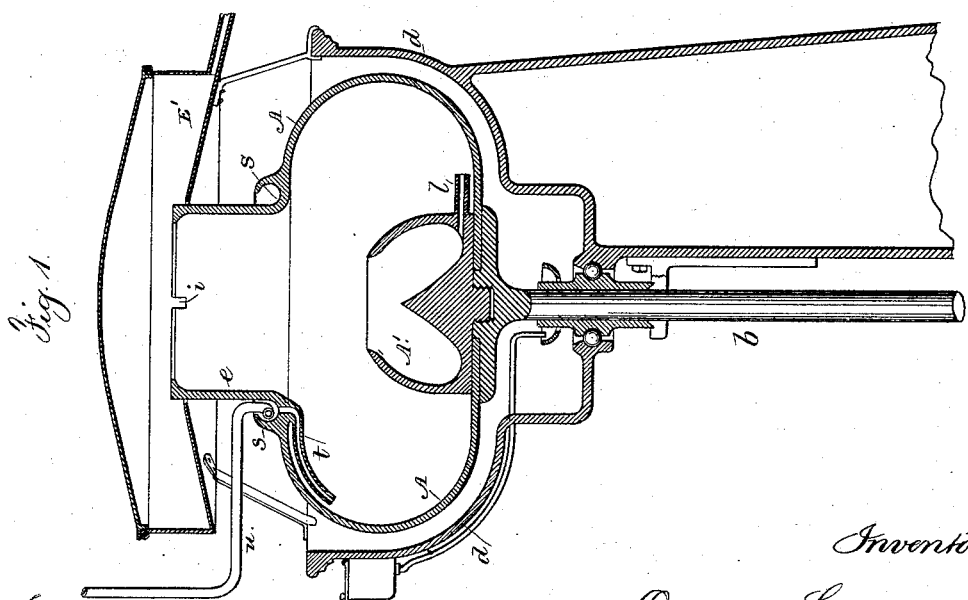
Witnesses
Chas. H. Smith
J. Staib
Inventor
Oscar Lamm Jr.
per Lemuel W. Serrell
atty

UNITED STATES PATENT OFFICE.

OSCAR LAMM, JR., OF STOCKHOLM, SWEDEN.

CENTRIFUGAL CREAMER.

SPECIFICATION forming part of Letters Patent No. 327,090, dated September 29, 1885.

Application filed July 11, 1884. (No model.)

*To all whom it may concern:*

Be it known that I, OSCAR LAMM, Jr., of Stockholm, in the Kingdom of Sweden, have invented an Improvement in Centrifugal Creamers for Separating Liquids of Different Specific Gravities, of which the following is a specification.

A centrifugal vessel has been employed with a pipe leading from the inner portion to the place of delivery for the heavier liquid and another opening for the discharge of a lighter liquid, as may be seen in Letters Patent No. 249,731. In this case both the separated liquids were discharged into pans or receptacles surrounding the neck of the separator.

Efforts have been made to discharge the cream through a pipe to a distant vessel; but the same is found to cause the cream to become frothy and to hold numerous bubbles of air, which interfere with the measuring of the cream with accuracy, and tend to promote fermentation or acidity.

My invention is made for delivering the skimmed milk or heavier liquid at a distance through a pipe, and for discharging the cream or viscid or semi-liquid material in a manner that prevents froth or air-bubbles in the same.

In the drawings, Figure 1 is a vertical section of my apparatus, and Fig. 2 is a similar view with the parts slightly modified.

I make use of a centrifugal vessel, A, supported upon a shaft, $b$, to which competent power is applied to rotate the same with the required velocity. This axis of the vessel usually stands vertically. I have shown the same in Fig. 1 as surrounded by a case, $d$. The vessel A is adapted to receive into it the milk or other liquid that it is required to separate or treat for the separation of the liquids or semi-liquids into two or more portions according to gravity.

There is shown a central receptacle. A', into which the liquid falls, and a pipe, $l$, that conveys the same into the liquid in the separator. The centrifugal action causes the heavier liquids to displace the lighter portions and occupy the outer space next to the inside of the rotary vessel, and the lightest portion of the liquid or semi-liquid—such as the cream—is nearest to the axis of the centrifugal vessel. I allow the lightest material—such as the cream— to pass out through the neck $e$, and be discharged from the edge thereof through a notch or opening at $i$ into an annular pan, E'—such as shown in Patent No. 249,731—and to pass away by a spout or tube; or else I discharge the same from the opening $i$ at the bottom of the vessel A, as seen in Fig. 2. In these cases the cream, as it is thrown off, strikes against the sides of the annular pan E' and runs down the same, and does not become frothy or full of air-bubbles. The pan E' is stationary and sustained by suitable supports. The heavier liquid—such as the skim-milk—is usually the largest in volume and the most troublesome to discharge, because when received into a pan it will only pass off by gravity, and cannot be taken to a room that is at a higher elevation, except by the use of a pump.

I combine with the centrifugal separator, in which the cream or semi-liquid material passes off near the axis of rotation, an annular trough, $s$, and a pipe, $t$, passing from the same into the space within the centrifugal vessel occupied by the skim-milk, said pipe opening near the inside of the centrifugal vessel, so that the skim-milk will flow through such pipe $t$ into the annular groove $s$, and I place a stationary pipe, $u$, with the open end in such groove where the skim-milk will flow into such pipe by its momentum under centrifugal action, and hence such liquid will flow through the pipe to a distance or to an elevated receptacle. Air may pass into such pipe with the skim-milk or other liquid; but this will not be injurious, as the same separates as soon as discharged into the reservoir or vessel.

In the form of centrifugal separator shown in Fig. 2 the neck is dispensed with; hence the annular trough $s$ may be within the vessel, as seen in Fig. 2.

It is to be understood that several kinds of openings have been used near the axis for the discharge of the cream or viscid liquid into the surrounding stationary vessel or pan, hence I do not limit myself in this particular.

I am also aware that annular troughs have been used, both stationary and revolving, with discharge-pipes connected with the same. I therefore do not claim either device separately considered.

In my separator the parts are easily removable and can be cleaned without difficulty, and the separation can be carried on with great rapidity.

I claim as my invention—

The combination, with the revolving centrifugal separator having a discharge-opening for the cream or other light liquid or semi-liquid, of an annular receptacle for the same, the annular trough *s* around the contracted mouth of the separator, the pipe *t*, opening at one end into such annular trough and at the other end into the space for the heaviest liquid within the centrifugal vessel, and the stationary delivery-pipe having its open end within the annular trough, into which the liquid is projected, substantially as set forth.

Signed by me this 2d day of July, A. D. 1884.

OSCAR LAMM, JR.

Witnesses:
HAROLD SERRELL,
WILLIAM G. MOTT.